US006751791B2

(12) United States Patent
Inaba

(10) Patent No.: US 6,751,791 B2
(45) Date of Patent: Jun. 15, 2004

(54) METHOD OF OPTIMIZING AN MPI PROCEDURE BY ALTERING TO A PROCEDURE OTHER THAN THE INVOKED MPI PROCEDURE PORTION OR BY ALTERING THE EXECUTION SEQUENCE

(75) Inventor: Masaru Inaba, Tokyo (JP)

(73) Assignee: NEC Corporation, Tokyo (JP)

( * ) Notice: Subject to any disclaimer, the term of this patent is extended or adjusted under 35 U.S.C. 154(b) by 542 days.

(21) Appl. No.: 09/739,216

(22) Filed: Dec. 19, 2000

(65) Prior Publication Data

US 2001/0052119 A1 Dec. 13, 2001

(30) Foreign Application Priority Data

Dec. 27, 1999 (JP) ............................. 11-370607

(51) Int. Cl.[7] ............................. G06F 9/45; G06F 9/46
(52) U.S. Cl. ..................... 717/154; 717/159; 719/313
(58) Field of Search ................... 717/151–160; 709/315, 316, 313; 719/313, 315, 316

(56) References Cited

U.S. PATENT DOCUMENTS

| 5,649,294 | A | * | 7/1997 | Ayerst et al. | ............... 340/7.22 |
| 5,701,489 | A | * | 12/1997 | Bates et al. | .................. 717/157 |
| 5,832,273 | A | * | 11/1998 | Mizuse | ......................... 717/154 |
| 5,920,721 | A | * | 7/1999 | Hunter et al. | ................. 717/159 |
| 6,016,397 | A | * | 1/2000 | Ogasawara et al. | ......... 717/160 |
| 6,085,035 | A | * | 7/2000 | Ungar | ......................... 717/116 |
| 6,286,136 | B1 | * | 9/2001 | Watanabe et al. | ............ 717/116 |
| 6,477,702 | B1 | * | 11/2002 | Yellin et al. | ................. 717/126 |
| 6,487,716 | B1 | * | 11/2002 | Choi et al. | ................... 717/159 |
| 6,530,079 | B1 | * | 3/2003 | Choi et al. | ................... 717/158 |
| 6,539,542 | B1 | * | 3/2003 | Cousins et al. | ............. 717/151 |

FOREIGN PATENT DOCUMENTS

| JP | 5-73449 | 3/1993 |
| JP | 11-120152 | 4/1999 |

OTHER PUBLICATIONS

Hirotaka Ogawa and Satoshi Matsuoka, OMPI: Optimizing MPI programs using Partial Evaluation, 1996, Department of Information Engineering, The University of Tokyo.*

Hwansoo Han, Chau–Wen Tseng, Pete Keleher, Reducing Synchronization Overhead for Compiler–Parallelized Codes on Software DSMs, Aug. 1997, Proceedings of the Tenth Workshop on Languages and Compilers for Parallel Computing.*

* cited by examiner

*Primary Examiner*—Kakali Chaki
*Assistant Examiner*—Trent J Roche
(74) *Attorney, Agent, or Firm*—Foley & Lardner LLP

(57) ABSTRACT

A method is disclosed for optimizing an MPI procedure by altering to a procedure other than the MPI procedure invocation portion or by altering the execution sequence. In this method of optimizing a program that uses MPI during compiling, optimization of an MPI procedure is realized by detecting an MPI procedure invocation portion within a received source program, and then altering the MPI procedure invocation portion to a procedure other than the detected MPI procedure invocation portion or by altering the execution sequence.

2 Claims, 8 Drawing Sheets

CALL MPI_SEND1(SEND_DATA1, 10, MPI_REAL, 1, TAG1, COMM1, ERR)
CALL MPI_SEND1(SEND_DATA2, 25, MPI_REAL, 1, TAG2, COMM1, ERR)

CALL MPI_SEND2(SEND_DATA1, 10, MPI_REAL, 1, TAG1, COMM1, ERR)
CALL MPI_SEND(SEND_DATA2, 25, MPI_REAL, 1, TAG2, COMM1, ERR)

B=1
CALL MPI_SEND(A, N, MPI_REAL, 1, TAG1, COMM1, ERR)
A=A+B
C=2

Fig. 11

```
CALL MPI_ISEND(A,N,MPI_REAL,1,TAG1,COMM1,REQUEST1,ERR)
B=1
C=2
CALL MPI_WAIT(REQUEST1,STATUS,ERR)
A=A+B
```

Fig. 12

```
DO I=0,N-1
   IF (I.EQ.0) THEN
      DO J=0,N-1
         IF (J.NE.0) THEN
            CALL MPI_SEND(X,1,MPI_REAL,J,TAG1,COMM1,ERR)
         END IF
      END DO
   ELSE
      CALL MPI_RECV(X,1,MPI_REAL,I,TAG1,COMM1,ERR)
   END IF
END DO
```

Fig. 13

```
CALL MPI_BCAST(X,1,MPI_REAL,0,COMM1,ERR)
```

US 6,751,791 B2

METHOD OF OPTIMIZING AN MPI PROCEDURE BY ALTERING TO A PROCEDURE OTHER THAN THE INVOKED MPI PROCEDURE PORTION OR BY ALTERING THE EXECUTION SEQUENCE

BACKGROUND OF THE INVENTION

1. Field of the Invention

The present invention relates to an optimization method by a compiler that compiles a program using a message-passing interface (MPI), and particularly to an optimization method that realizes a reduction in the execution time of an MPI program.

2. Description of the Related Art

In compilers of the prior art, output of an object program is realized by carrying out optimization of a received source program that places an emphasis on either the code size or execution speed.

This type of compiler described in, for example, Japanese Patent Laid-open No. 120152/99, comprises a syntactic analysis section to analyze the syntax of the source program, and a code generation section that, following completion of syntactic analysis, selects commands based on the analysis results and instructions, generates output code, and outputs the object program.

However, since a message-passing interface (MPI) is a library that does not depend on language, the above-described compiler of the prior art typically incorporates a command to invoke a procedure into the object program as described without changing the MPI procedure invocation in the source program.

In other words, even though there is plenty of room for optimization regarding MPI procedure invocations, it was not considered to be an object of optimization.

Essentially, optimization in the above-described prior-art compiler suffers from a problem that since a command to invoke a procedure was incorporated into the object program as described without changing the MPI procedure invocation in the source program, the MPI procedure invocation is not considered to be object of optimization, the execution time of the MPI program could not be shortened.

SUMMARY OF THE INVENTION

It is an object of the present invention to provide an optimization method by a compiler that can realize a reduction in the program execution time by taking an MPI procedure invocation portion as an object of optimization by the compiler when compiling a program that employs message-passing interface (MPI).

To accomplish the aforementioned object, the present invention performs optimization of MPI procedures by detecting an MPI procedure invocation portion within a received source program and then altering it to another procedure or altering the execution sequence.

According to the present invention, a reduction in the execution time of an MPI program can be realized because an MPI procedure invocation portion is taken as an object of optimization and the MPI procedure is altered to a more efficient procedure or the execution sequence is altered for optimization such as simultaneous execution of communication and processing.

According to an embodiment of the present invention, when a correct type is being used as the argument of the invoked MPI procedure, an object program is outputted such that a procedure is invoked in which a type check is omitted.

According to this embodiment, if no errors are found when performing an error check of the argument when compiling, a reduction of execution time is realized by altering such that a high-speed MPI procedure is invoked in which an error check is not performed during execution.

According to another embodiment of the present invention, an argument relating to the communication data size of the invoked MPI procedure is checked, and if the communication data size can be determined during compiling, an object program is outputted such that the optimum procedure according to the communication data size is invoked.

According to this embodiment, when the communication size is found during compiling, a reduction of the execution time can be realized by altering such that an MPI routine is invoked that uses the optimum protocol according to the size.

According to yet another embodiment of the present invention, when a synchronous communication MPI procedure invocation is detected, statements preceding and following the statement of the MPI procedure invocation are analyzed, and if, based on the analysis, there is an execution statement that depends only on data that have no relation to communication data, and moreover, the meaning of the program is not changed by movement of the statement, the execution sequence of the execution statement is altered to follow the MPI procedure, a communication waiting procedure is inserted after the list of execution statement, and an object program is outputted in which the MPI procedure is altered to an asynchronous communication procedure.

According to this embodiment, by altering a synchronous communication MPI procedure to an asynchronous communication MPI procedure and moving an execution statement that is not relevant to communication data to immediately follow the MPI procedure, simultaneous execution of communication and processing is performed without placing a burden on the program developer to thereby realize a reduction in the execution time.

According to yet another embodiment of the present invention, when a barrier synchronization MPI procedure invocation is detected, the statements preceding and following the MPI procedure invocation statement are analyzed, and if, based on the analysis, it is determined that the MPI procedure is unnecessary, an object program is outputted in which the statement of the procedure invocation is eliminated.

According to this embodiment, the necessity of a barrier synchronization is determined, and if not necessary, the barrier synchronization invocation is eliminated so that a reduction in execution time is realized.

Finally, according to another embodiment, in an optimization method at the time of compiling the MPI program if one-to-one communication within a loop is detected, and the analysis of the communication pattern shows that the communication pattern corresponds to MPI group communication, an object program is outputted such that the group communication procedure is invoked instead.

According to this embodiment, a reduction in execution time can be realized by recognizing communication patterns in which specific group communication is performed using one-to-one communication and then replacing with a more efficient group communication.

The above and other objects, features, and advantages of the present invention will become apparent from the fol-

BRIEF DESCRIPTION OF THE DRAWINGS

FIG. 8 shows a source program that is equivalent to the state of the source program of FIG. 7 after optimization by the first optimization method.

FIG. 9 shows a source program that is equivalent to the state of the source program of FIG. 7 after optimization by the second optimization method.

FIG. 10 shows an example of a source program.

FIG. 11 shows a source program that is equivalent to the state of the source program of FIG. 10 after optimization by the third optimization method.

FIG. 12 shows an example of a source program.

FIG. 13 shows a source program that is equivalent to the state of the source program of FIG. 12 after optimization by the fifth optimization method.

DETAILED DESCRIPTION OF THE PREFERRED EMBODIMENTS

Figure 1:
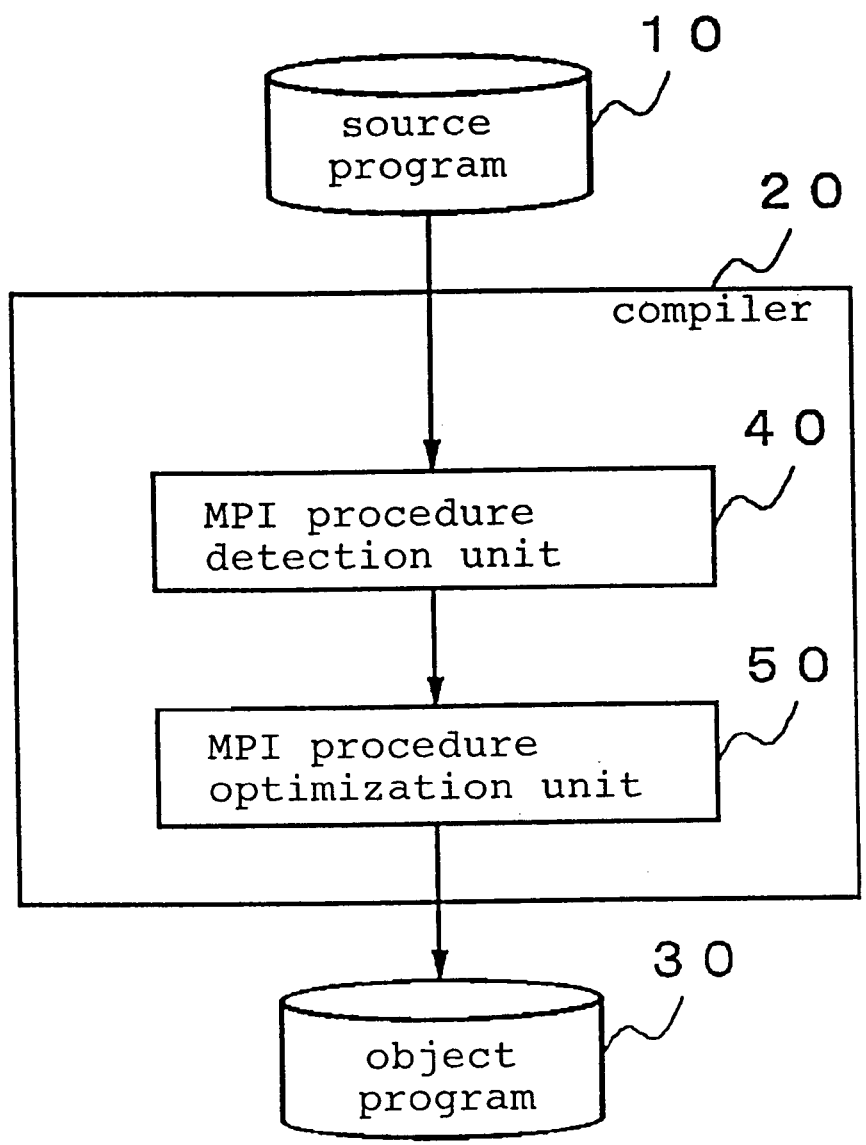
FIG. 1 is a block diagram showing the system configuration of a compiler in which the optimization method according to an embodiment of the present invention has been applied.

Referring now to FIG. 1, there is shown a compiler 20 that receives source program 10 and outputs object program 30, and comprises MPI procedure detection unit 40 and MPI procedure optimization unit 50. FIG. 1 shows only distinct components of the present invention, a syntactic analysis unit and a code generation unit similar to the prior art, and components related to output of the object program are not shown.

When an MPI procedure invocation portion is detected in received source program 10 by MPI procedure detection unit 40, MPI procedure optimization unit 50 performs optimization of the MPI procedure invocation portion and generates object program 30.

MPI procedure optimization unit 50 carries out the optimization processing of the MPI procedure invocation portion using the various optimization methods described hereinbelow. Explanation of these optimization methods is presented with reference to flow charts and an example of the source program.

Figure 2:
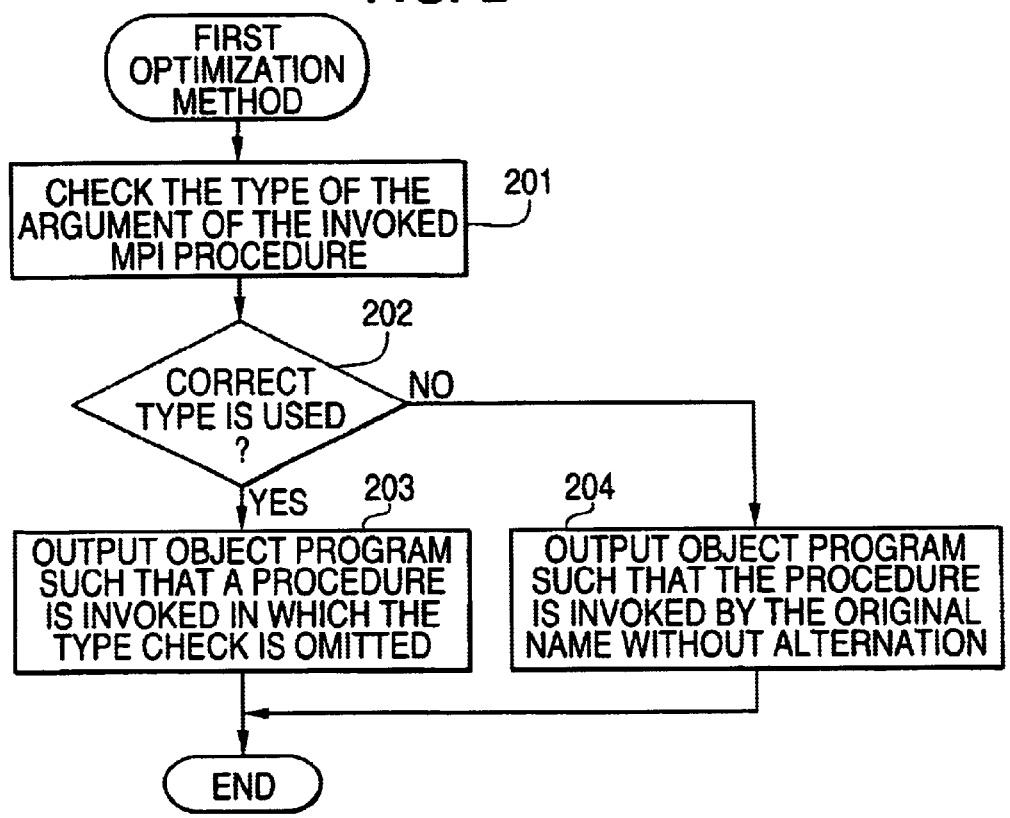
FIG. 2 is a flow chart showing the procedures of the first optimization method of the present invention.

First, the first optimization method is explained with reference to the flow chart of FIG. 2.

The MPI procedure performs an error check of the argument in the execution time, but in this first optimization method, an error check of the argument is performed when compiling, and if no errors are found, the MPI procedure invocation portion is altered such that when executing, a high-speed version of the MPI procedure is invoked in which an error check is not carried out, thereby realizing a reduction in execution time.

MPI procedure optimization unit 50 checks the type of the argument of the invoked MPI procedure in Step 201. Then, in Step 202, MPI procedure optimization unit 50 determines whether or not the correct type is being used for the type of the argument of the invoked MPI procedure. If it is determined in Step 202 that the correct type is being used, MPI procedure optimization unit 50 outputs object program 30 to invoke a procedure in which the type check is omitted in Step 203.

If it is determined in Step 202 that the correct type is not being used, however, object program 30 is outputted to invoke the procedure by the original name without alteration of procedures in Step 204. Alternatively, if the correct type is not being used, it may also be taken as a compilation error.

Figure 7:
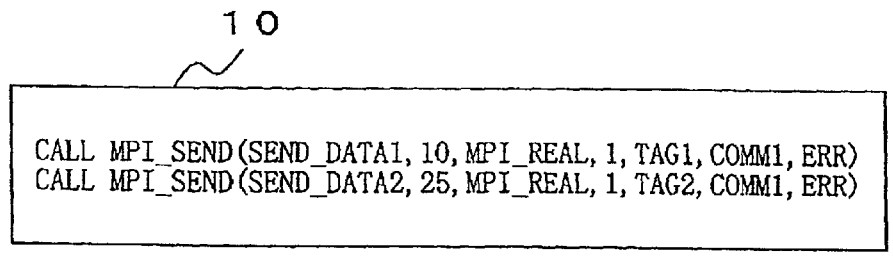
FIG. 7 shows one example of the source program.

For example, when source program 10 is described in Fortran, an MPI procedure is invoked as shown in FIG. 7, and the type of the argument is correct, the result of optimization is equivalent to the input of source program 10 that includes the statement of FIG. 8. In this case, "MPI_SEND1" is a procedure in which the error check process of the argument of "MPI_SEND" has been omitted.

Figure 3:
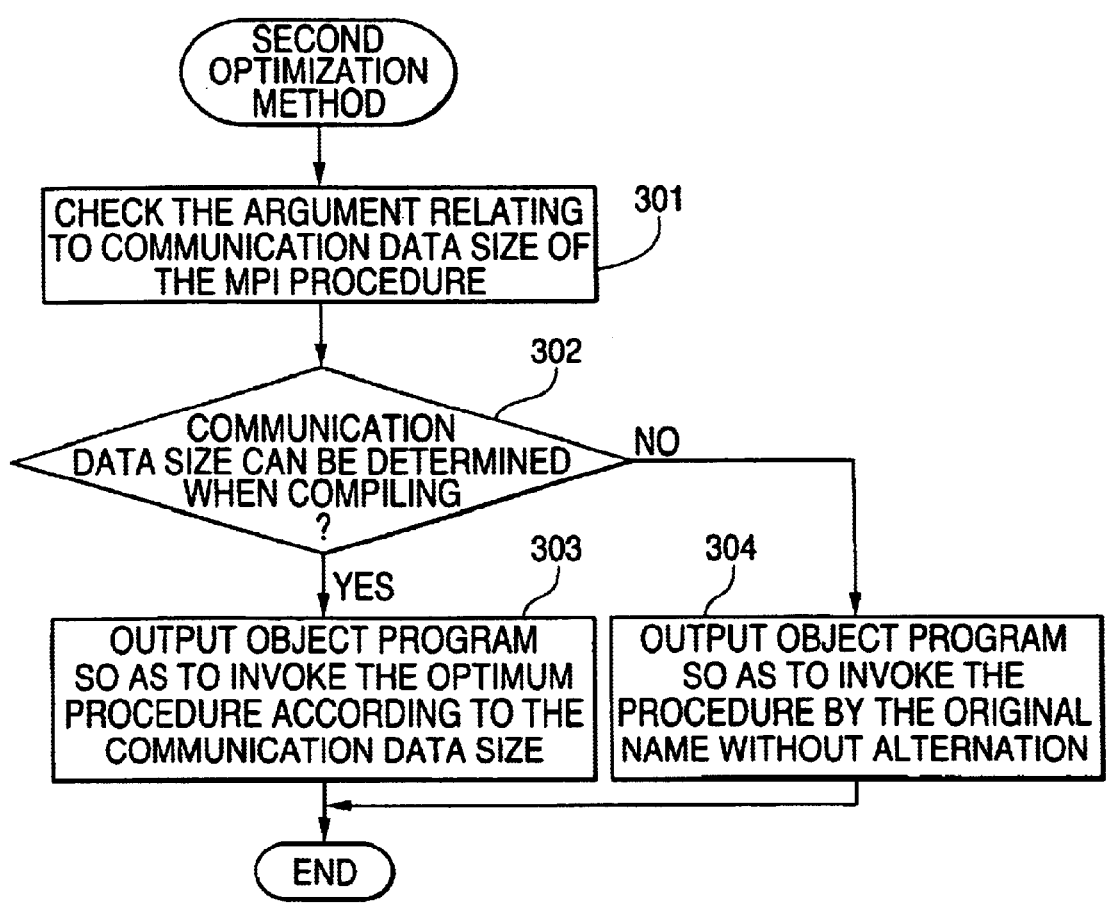
FIG. 3 is a flow chart showing the procedures of the second optimization method of the present invention.

The second optimization method is next described with reference to the flow chart of FIG. 3.

Even when a plurality of communication protocols can be used, an MPI program normally uses a single communication protocol from the start to the completion of the program. In the interest of reducing the execution time, however, the communication protocol which when used affords the optimum communication speed must be determined and selected according to differences in data size. Accordingly, when the communication size is learned during compiling in this second optimization method, a reduction in execution time can be realized by altering of the MPI procedure so as to invoke the MPI routine that uses the optimum protocol according to size.

In Step 301, MPI procedure optimization unit 50 checks the argument relating to communication data size of the MPI procedure that is invoked, and then determines in Step 302 whether or not the communication data size can be determined when compiling. If it is determined in Step 302 that the communication data size can be determined during compilation, object program 30 is outputted in Step 303 to invoke the optimum procedure according to the communication data size.

The relation between the communication data size and the corresponding procedure is prepared inside the compiler in advance. However, alteration of the MPI procedure invocation portion by means of compiling options or by instruction lines in source program 10 may be allowed so as to enable a program developer to make fine adjustments.

If it is determined in Step 302 that the communication data size cannot be determined during compiling, object program 30 is outputted in Step 304 to invoke the procedure by the original name without alteration of the MPI procedure invocation portion.

It is assumed that, a procedure is employed that uses protocol A when the communication data size is less than, for example, 80 bytes and protocol B when the communication data size is equal to or greater than 80 bytes. Source program 10 is described in Fortran, and an MPI procedure is invoked as shown in FIG. 7. In this case, the communication data size can be determined during compiling, and optimization is performed such that, if "MPI_REAL" is 4 bytes, the first line having a communication data size of 40 bytes uses protocol A and the second line having a communication data size of 100 bytes uses protocol B. The result of optimization is equivalent to a case of applying source program 10 that includes the statement shown in FIG. 9. In this case, "MPI_Send2" is a procedure that uses protocol A, and "MPI_SEND" is a procedure that uses protocol B.

Figure 4:
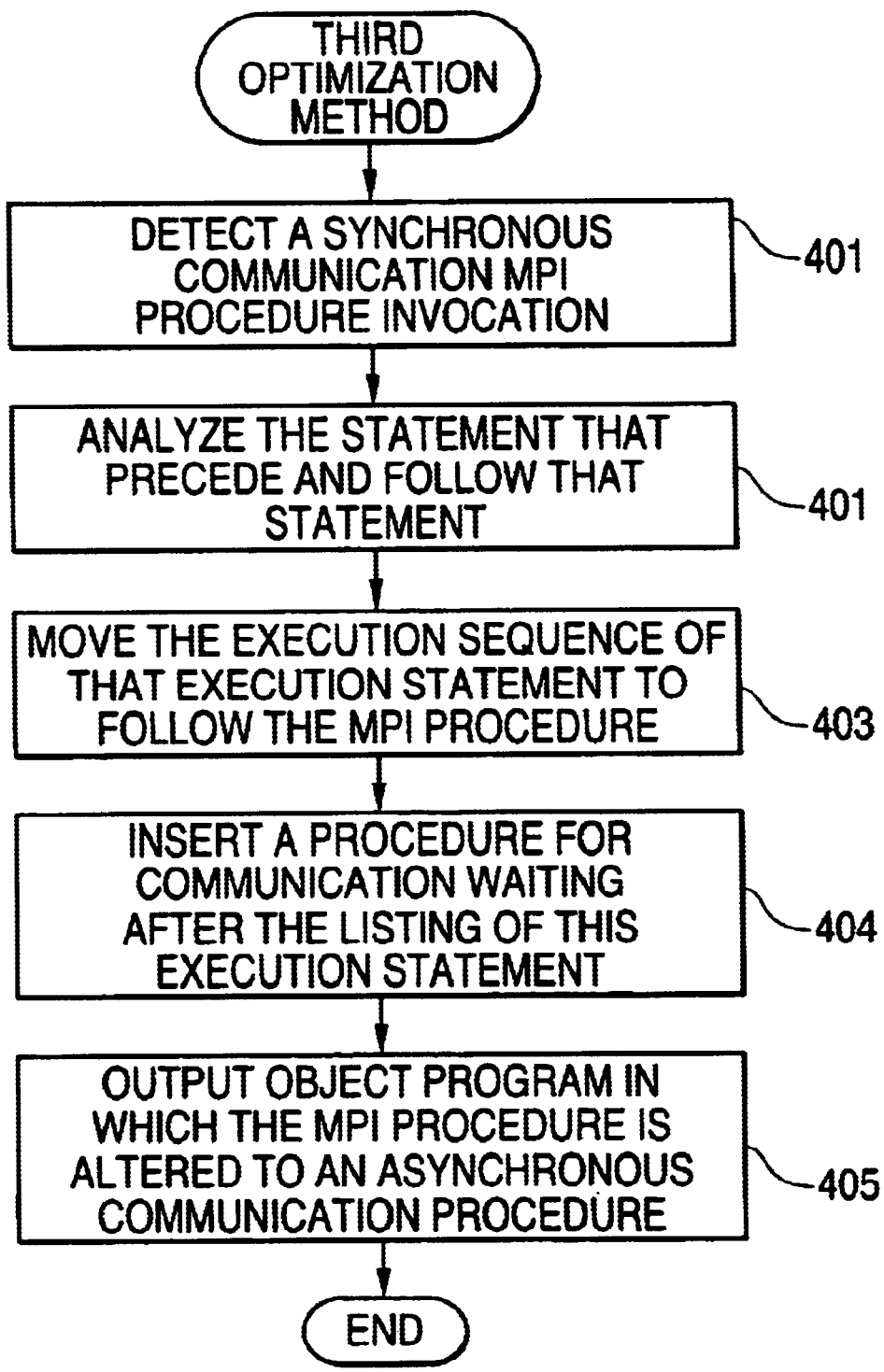
FIG. 4 is a flow chart showing the procedures of the third optimization method of the present invention.

The third optimization method is next explained with reference to the flow chart of FIG. 4.

MPI communication includes synchronous communication and asynchronous communication. Synchronous communication does not allow the execution of other processing until communication is completed, but also prevents a program developer from causing program errors relating to accessing data which are the object of communication. Asynchronous communication, on the other hand, allows other processing to be performed up to completion of the communication and is useful for reducing the execution time of the program, but tends to allow the program developer to make the mistake of accessing data which is the object of communication in the midst of other processing. In the third optimization method, the compiler alters a synchronous communication MPI procedure to an asynchronous communication MPI procedure and moves execution statements that are not relevant to communication data to immediately follow the MPI procedure, thereby realizing simultaneous execution of communication and processing and a reduction of the execution time without burdening the program developer.

When MPI procedure optimization unit 50 detects a synchronous communication MPI procedure invocation in Step 401, it analyzes the statements that precede and follow that statement in Step 402.

If the analysis shows that there is an execution statement related only to data that have no relation to the communication data, and if movement of the statement does not alter the meaning of the program, MPI procedure optimization unit 50 moves the execution sequence of that execution statement to follow the MPI procedure in Step 403. As a result, an execution statement including only data that have no relation to one or more items of communication data can be listed to follow the MPI procedure.

MPI procedure optimization unit 50 then inserts a procedure for communication waiting after the listing of this execution statement in Step 404, and in Step 405, outputs object program 30 in which the MPI procedure is altered to an asynchronous communication procedure. For example, it is assumed that source program 10 is described in Fortran, and statements are listed as shown in FIG. 10. It is also assumed that the communication data are variable A, and it is determined during compiling that there is no overlap between the storage area of variable A and the storage areas of variable B and variable C.

Since the assignment statement to variable B of the first line has no relation to variable A in this case, the statement can be replaced with the invocation of the MPI procedure "MPI_SEND". In addition, since the assignment statement to variable C of the fourth line has no relation to the operation that uses A and B of the third line, the exchange of the statements is possible.

The MPI procedure "MPI_SEND" is then altered to the asynchronous communication procedure "MPI_ISEND" and the waiting procedure "MPI_WAIT" that corresponds to this communication is inserted at the end of the list of execution statements for executing at the same time as communication. The result is equivalent to applying a source program that includes a statement such as shown in FIG. 11.

Figure 5:
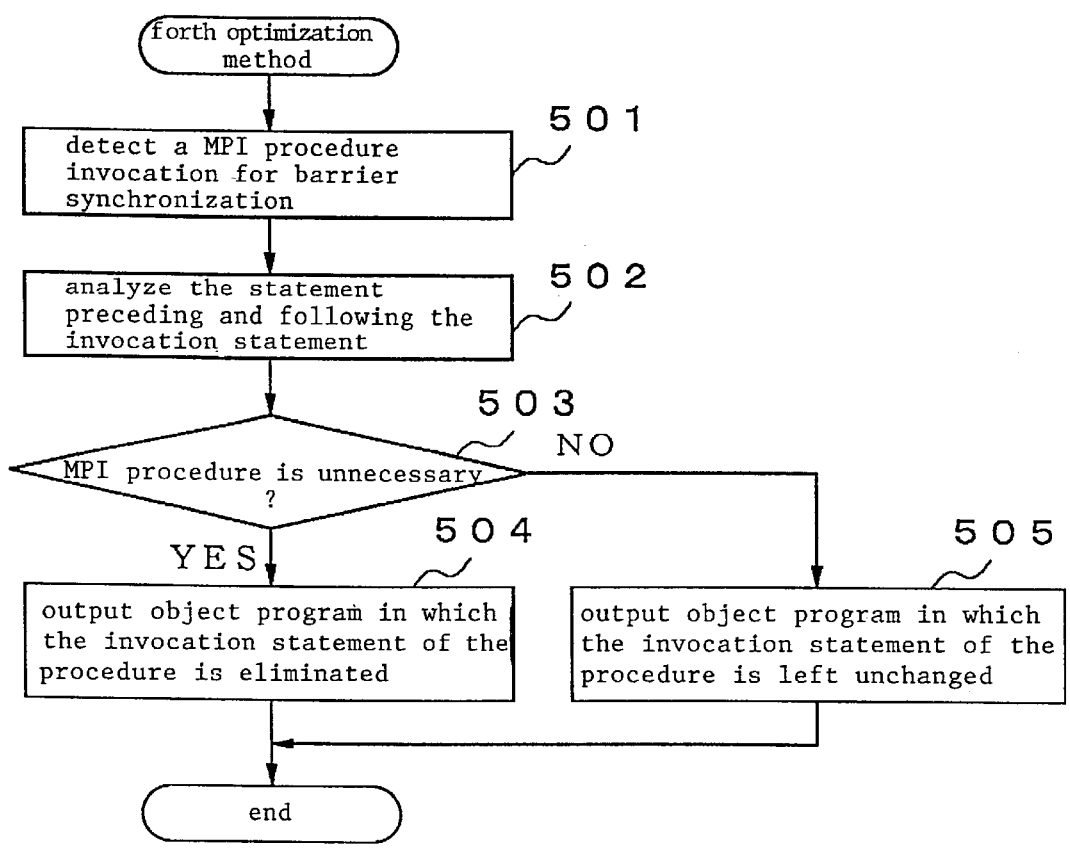
FIG. 5 is a flow chart showing the procedures of the fourth optimization method of the present invention.

The fourth optimization method is next explained with reference to the flow chart of FIG. 5.

Program developers tend to frequently employ barrier synchronization to cause programs to operate safely. As a result, an unnecessary barrier synchronization may be included in a program. In this fourth optimization method, it is determined whether or not a barrier synchronization is necessary, and if not necessary, the barrier synchronization invocation is eliminated thereby realizing a reduction in execution time.

When MPI procedure optimization unit 50 detects an MPI procedure invocation for barrier synchronization in Step 501, it analyzes the statements preceding and following the invocation statement.

MPI procedure optimization unit 50 then determines in Step 503 whether or not the MPI procedure is necessary. If MPI procedure optimization unit 50 determines in Step 503 that the MPI procedure is unnecessary, it outputs object program 30 in Step 504 in which the invocation statement of the procedure is eliminated. If MPI procedure optimization unit 50 determines in Step 503 that the MPI procedure is necessary, it outputs object program 30 in Step 505 in which the invocation statement of the procedure is left unchanged.

Figure 6:
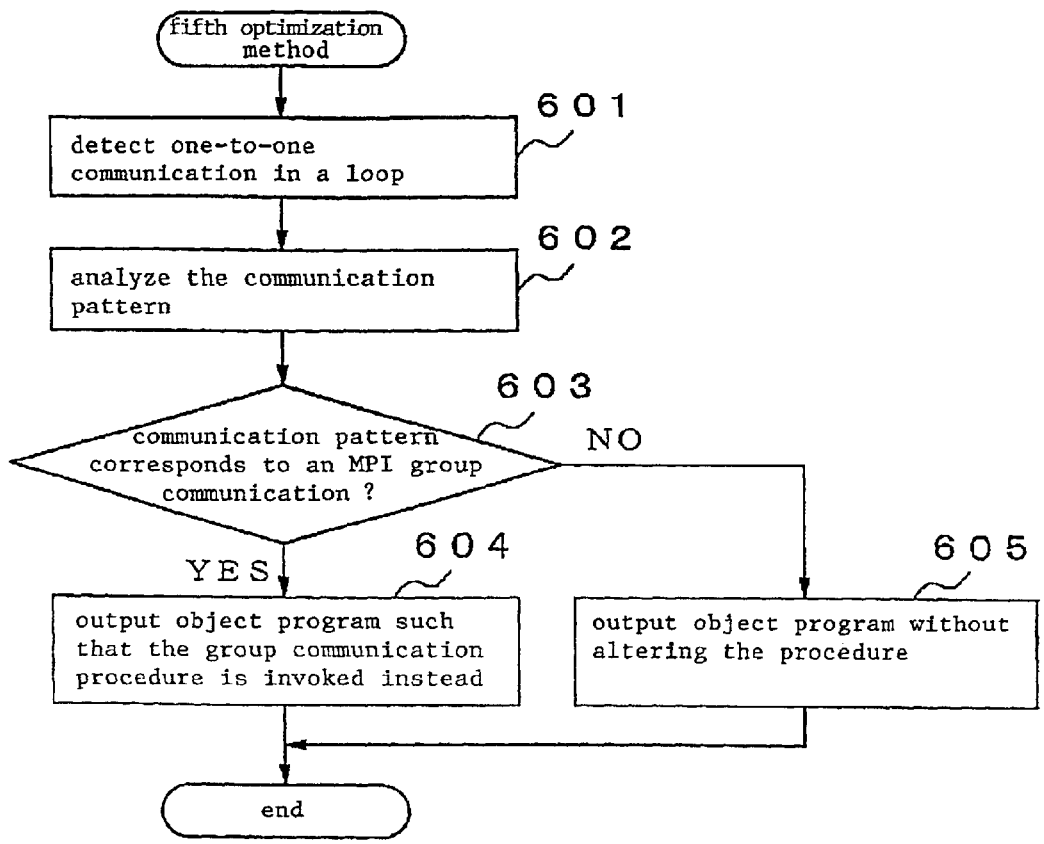
FIG. 6 is a flow chart showing the procedures of the fifth optimization method of the present invention.

The fifth optimization method is next explained with reference to the flow chart of FIG. 6.

In this fifth optimization method, a communication pattern is recognized that performs specific group communication using one-to-one communication to replace it with a more effective group communication, thereby realizing a reduction in the execution time.

When MPI procedure optimization unit 50 detects one-to-one communication in a loop in Step 601, it analyzes the communication pattern in Step 602. MPI procedure optimization unit 50 then determines in Step 603 whether or not the communication pattern corresponds to an MPI group communication. If it determines in Step 603 that the communication pattern corresponds to an MPI group communication, MPI procedure optimization unit 50 outputs object program 30 in Step 604 to invoke the group communication procedure instead. If it is determined in Step 603 that the communication pattern does not correspond to MPI group communication, MPI procedure optimization unit 50 outputs object program 30 in Step 605 without altering the procedure.

It is assumed that, for example, source program 10 is described in Fortran, and there is a statement list such as shown in FIG. 12. Since this case is understood to be the transmission of data from processor 0 to the remaining processors, the results of optimization are equivalent to applying source program 10 that includes the statement shown in FIG. 13, which is this series of statements altered to "MPI_BCAST".

The first to fifth optimization methods described hereinabove can each be executed independently, or can be executed by combining with each other.

Although the present invention has been described by taking as examples the above-described preferable embodiment and working examples, the present invention is not necessarily limited to the embodiment and examples described hereinabove and may be worked in various modifications within the scope of the technical concept of the invention.

According to the optimization method of the present embodiment described hereinabove, an MPI procedure invocation portion is taken as the object of optimization, and a reduction in the execution time of an MPI program can be realized by performing optimization by, for example, altering to a more efficient procedure or altering the execution sequence for simultaneous execution of communication and processing.

While a preferred embodiment of the present invention has been described using specific terms, such description is for illustrative purposes only, and it is to be understood that changes and variations may be made without departing from the spirit or scope of the following claims.

What is claimed is:

1. An optimization method at the time of compiling a program that employs an MPI, comprising the steps of:

detecting an MPI procedure invocation portion within a received source program;

altering the detected MPI procedure invocation portion to another procedure or altering the execution sequence to perform optimization of said MPI procedure wherein said step of altering the execution sequence to perform optimization of an MPI procedure includes steps of:

detecting a synchronous communication MPI procedure invocation;

analyzing statements preceding and following a statement of said MPI procedure invocation;

if the analysis shows that there is an execution statement including only data that have no relation to communication data, and if movement of the statement causes no change in the meaning of the program, moving the execution sequence of said execution statement to follow the MPI procedure;

inserting a communication waiting procedure after a list of said execution statement; and outputting an object program in which said MPI procedure has been altered to an asynchronous communication procedure.

2. An optimization method at the time of compiling a program that employs an MPI, comprising the steps of:

detecting an MPI procedure invocation portion within a received source program;

altering the detected MPI procedure invocation portion to another procedure or altering the execution sequence to perform optimization of said MPI procedure wherein the step of altering the execution sequence to perform the optimization of the MPI procedure includes steps of:

detecting one-to-one communication that is in a loop and analyzing a communication pattern; and if said communication pattern includes one that corresponds a MPI group communication, outputting an object program to invoke said group communication procedure.

* * * * *